United States Patent
Ichinose

(10) Patent No.: US 8,363,964 B2
(45) Date of Patent: Jan. 29, 2013

(54) SIGNAL PROCESSING APPARATUS, SIGNAL PROCESSING METHOD, AND PROGRAM

(75) Inventor: Tsutomu Ichinose, Tochigi (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 12/750,755

(22) Filed: Mar. 31, 2010

(65) Prior Publication Data

US 2010/0260429 A1    Oct. 14, 2010

(30) Foreign Application Priority Data

Apr. 8, 2009    (JP) ................................. 2009-093923

(51) Int. Cl.
*G06K 9/36*    (2006.01)
(52) U.S. Cl. ..................................................... 382/232
(58) Field of Classification Search .......... 382/232–233, 382/236, 238–240; 341/50–51, 61, 63, 95; 708/551; 348/445

See application file for complete search history.

(56) References Cited

U.S. PATENT DOCUMENTS

| 6,198,848 | B1 * | 3/2001 | Honma et al. ................ 382/232 |
| 6,987,539 | B2 * | 1/2006 | Kondo et al. ................ 348/441 |

FOREIGN PATENT DOCUMENTS

| JP | 05-199403 | 8/1993 |
| JP | 11-168665 | 6/1999 |

* cited by examiner

*Primary Examiner* — Jose Couso
(74) *Attorney, Agent, or Firm* — Wolf, Greenfield & Sacks, P.C.

(57) ABSTRACT

A signal processing apparatus according to an embodiment of the present invention includes: a compression processing unit that performs compression processing on n-bit data; a bit-number conversion unit that converts m-bit input image data into n-bit data (where n<m) by performing round-up or round-down processes on the lower (m−n) bits of the m-bit input image data, and feeds the obtained n-bit data to the compression processing unit; and a conversion processing control unit that selects either one of the round-up process and the round-down process to be performed on each datum of the n-bit data in accordance with a predefined rule on the basis of the position of a frame to which the datum belongs and the position in the frame at which the datum is located, and instructs the bit-number conversion unit to perform the selected round-up process or round-down process.

5 Claims, 9 Drawing Sheets

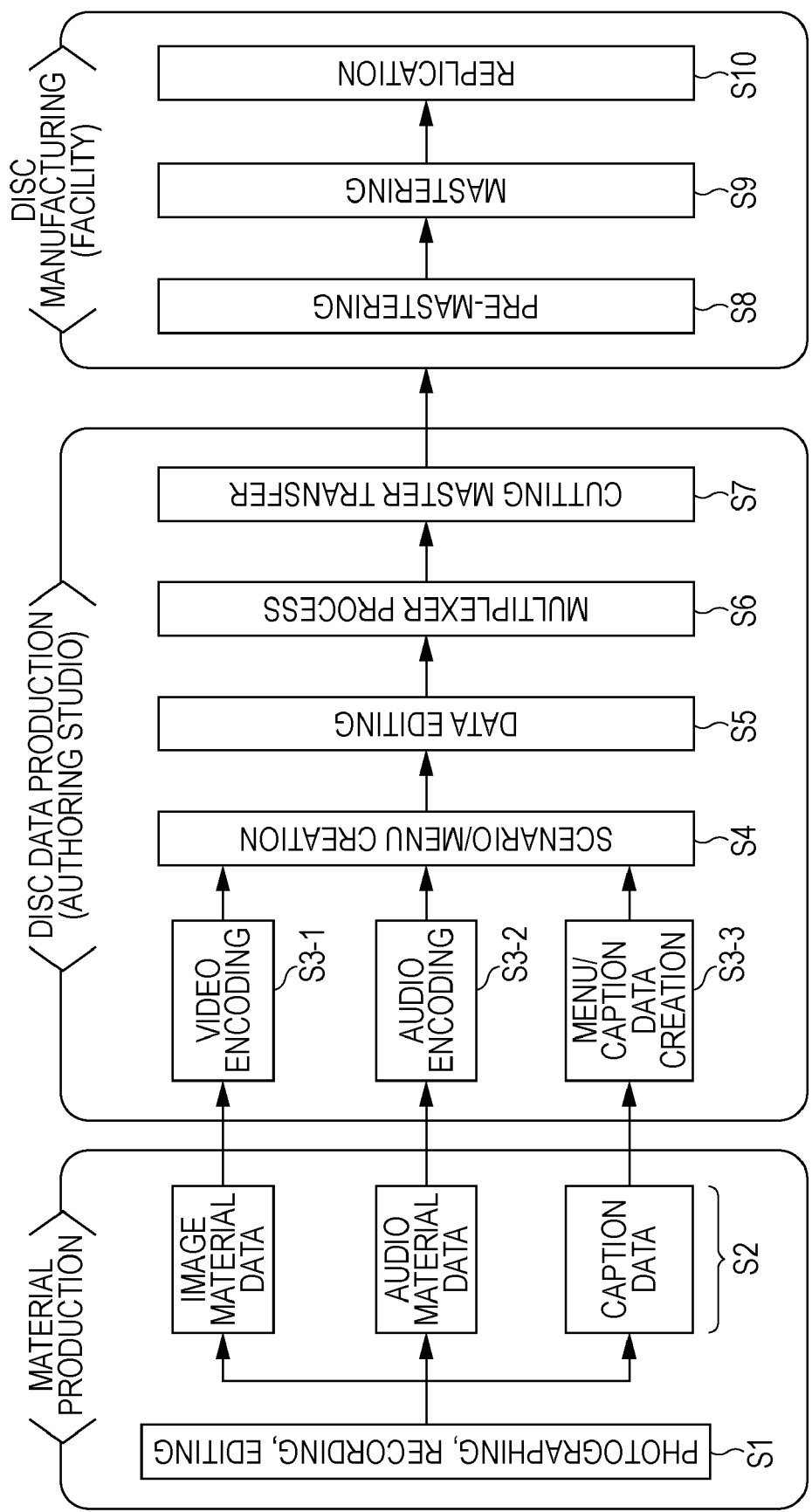

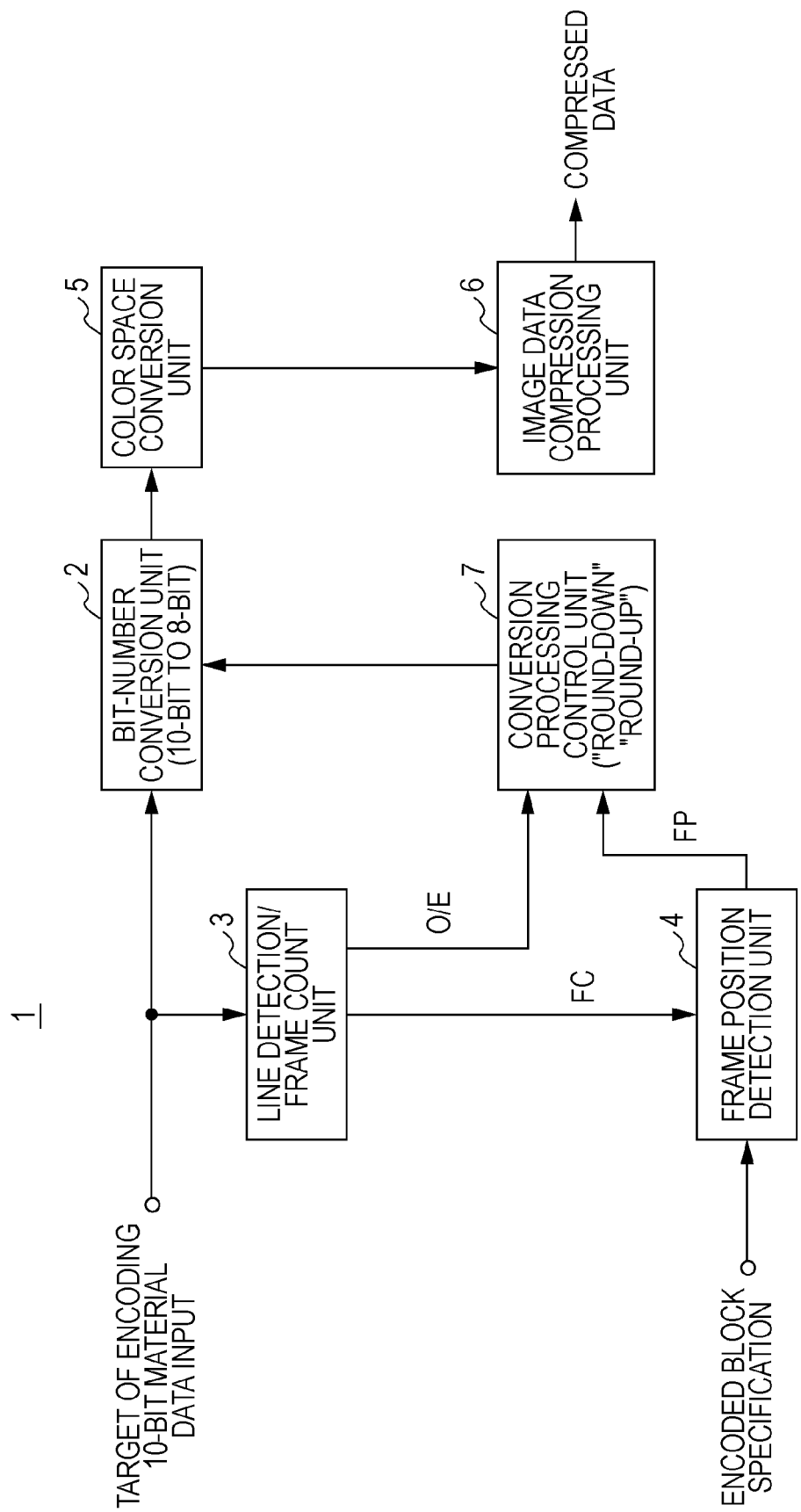

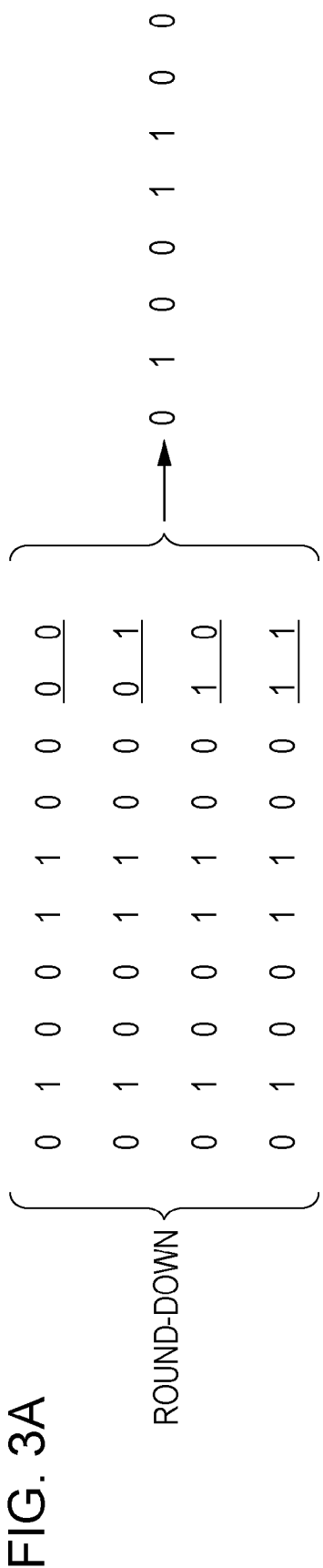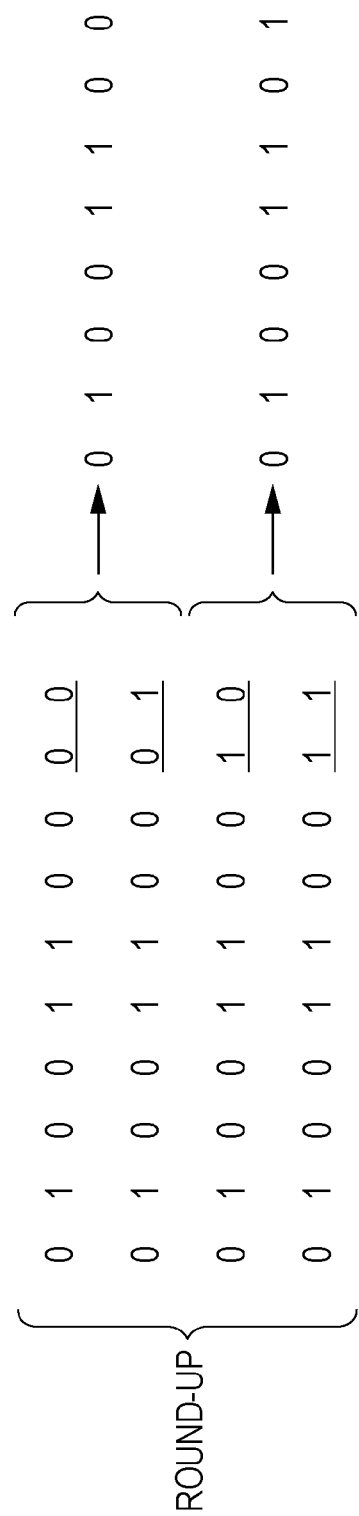

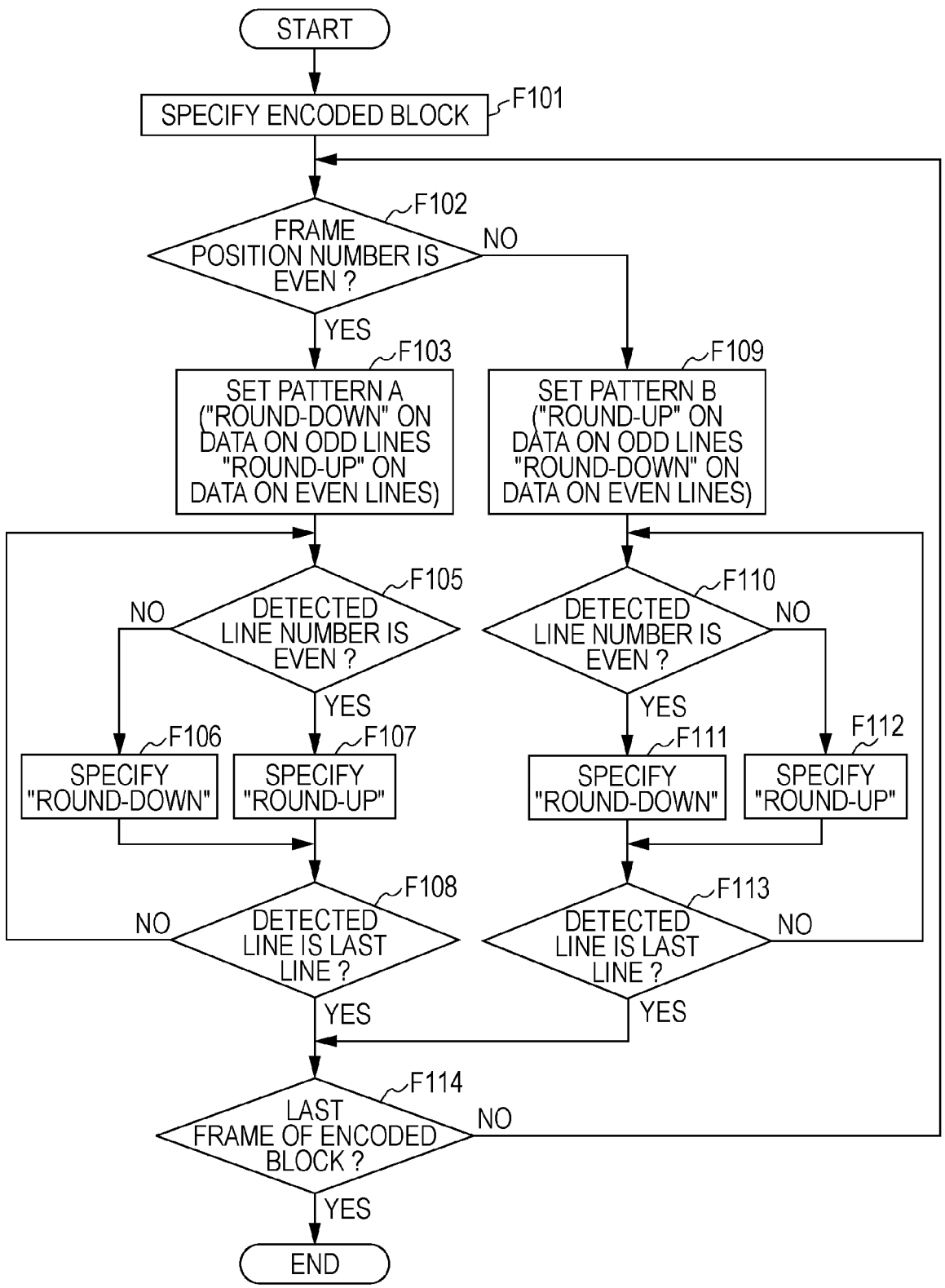

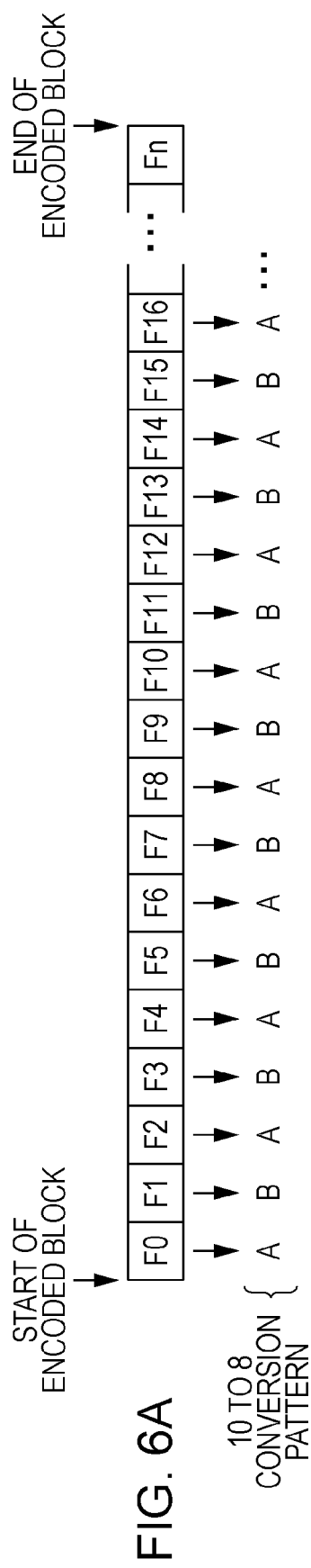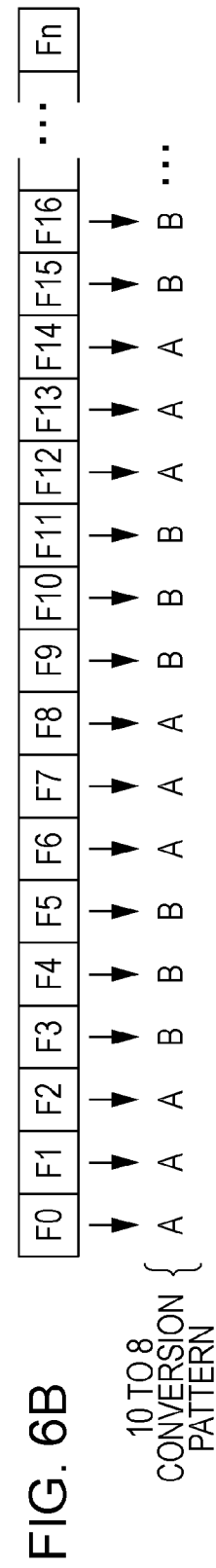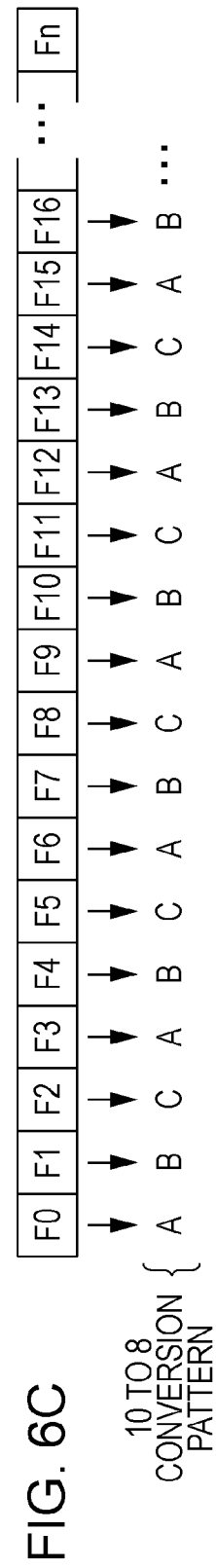

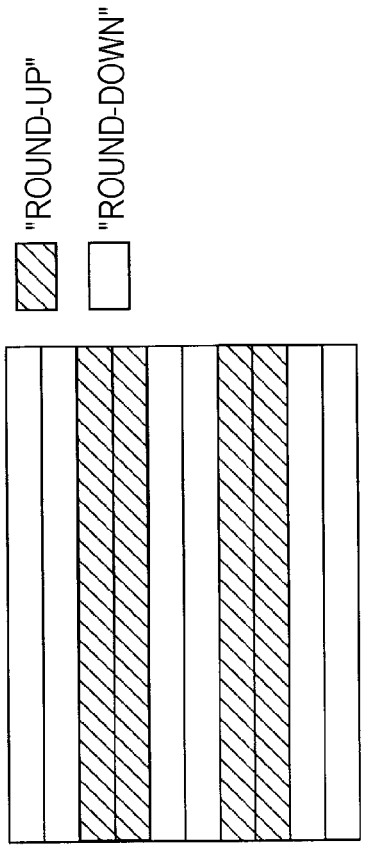
FIG. 7A
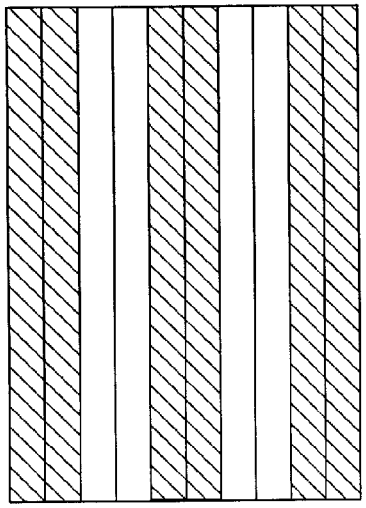
FIG. 7B
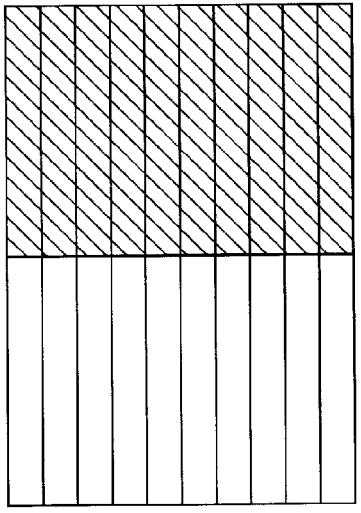
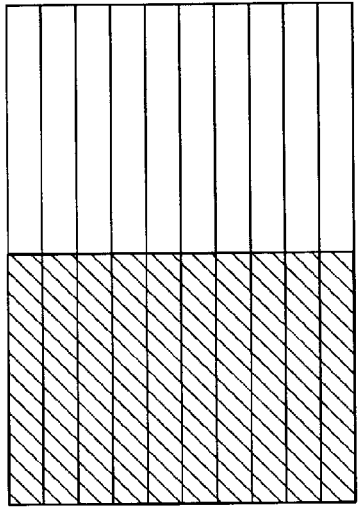

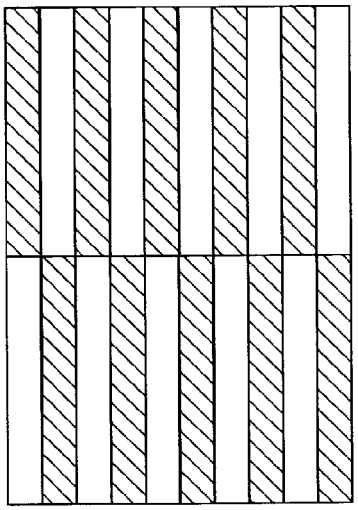
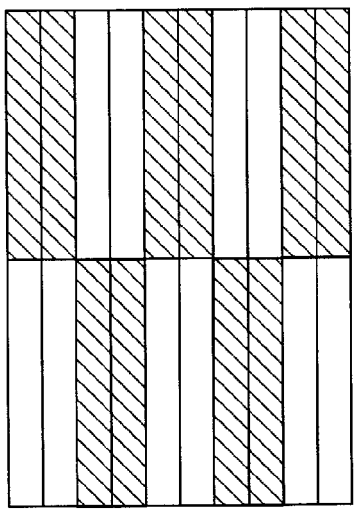
FIG. 8A
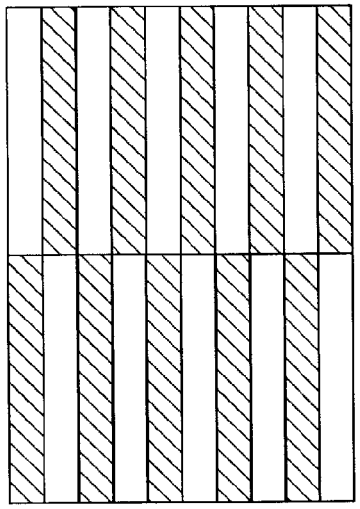
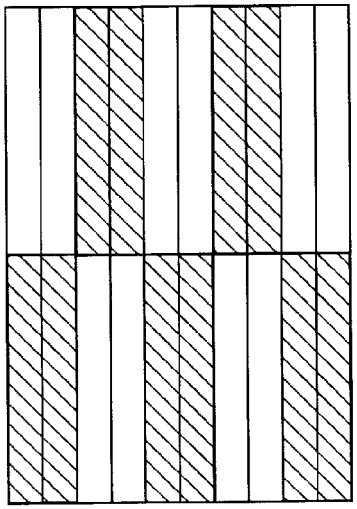
FIG. 8B

FIG. 9
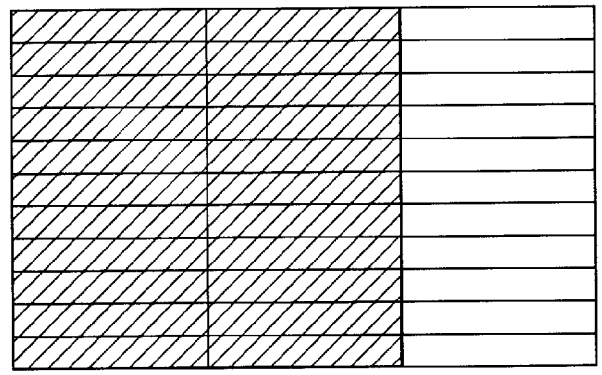
CONVERSION PATTERN A
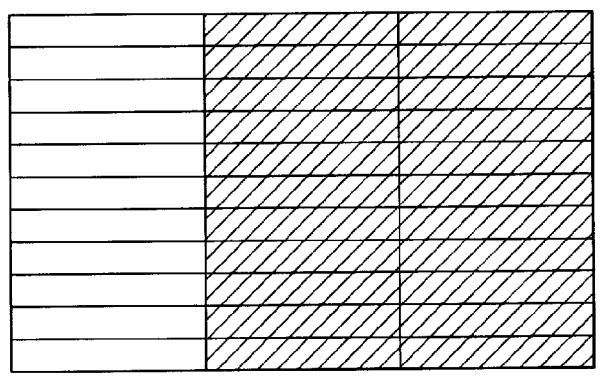
CONVERSION PATTERN B
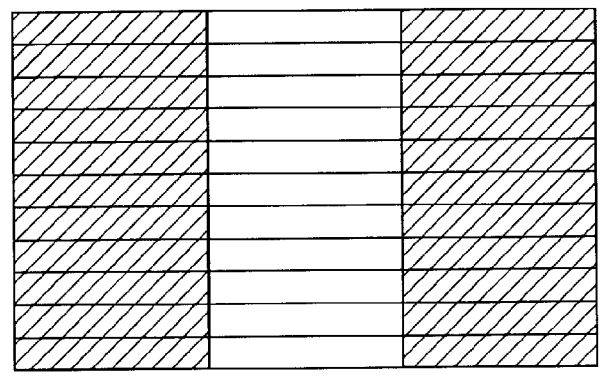
CONVERSION PATTERN C

SIGNAL PROCESSING APPARATUS, SIGNAL PROCESSING METHOD, AND PROGRAM

BACKGROUND OF THE INVENTION

1. Field of the Invention

The present invention relates to signal processing apparatuses that processes image signals, signal processing methods, and programs that realize the signal processing methods.

2. Description of the Related Art

Japanese Unexamined Patent Application Publication No. 11-168665, and Japanese Unexamined Patent Application Publication No. 05-199403 have been disclosed as documents about the related art.

For example, in the manufacture of reproducing-only discs compliant with the Blu-ray disc (registered trademark, and called BD for short hereinafter) standard (BD-ROMs), authoring systems, which create content to be recorded, perform predefined compression processing on image materials.

SUMMARY OF THE INVENTION

The format of data on which the compression processing is performed is typically an 8-bit format. However, the format of master data used in authoring studios is typically a 10-bit format. Therefore, 10-bit data are converted into 8-bit data before the compression processing. One simple method for converting 10-bit input data into 8-bit data is a method in which compression processing is performed by uniformly "rounding-down" or "rounding-up" the lower 2 bits of the 10-bit input data. In this case, however, there is a problem in that deterioration in the quality of image signals after the compression processing, such as the generation of a quasi-contour occurs due to rounding errors and the like of the conversion.

In the processing of converting data with a certain bit-depth into data with a different bit-depth, there are alternative methods that prevent a quasi-contour called banding from occurring such as a method to use a dedicated apparatus or a method to perform compression processing on data that are obtained by overlapping original image data with random noise components at the data input stage, where the process of overlapping original image data with random noise components at the data input stage is a kind of dithering process. However, because the compression processing is performed even on the noise components, the quality of images is deteriorated. Especially, the quality of image data with a high bit rate such as image data recorded in BDs is significantly deteriorated. There is also another problem in that an additional dithering process results in the inefficiency of the compression processing. To put it concretely, storing temporarily the data obtained by overlapping original image data with random noise components and the like take time, resulting in the inefficiency of the conversion processing.

The present invention proposes a bit-conversion method that is capable of alleviating the occurrence of quasi-contours and the deterioration in the quality of images without sacrificing the efficiency of compression processing.

A signal processing apparatus according to an embodiment of the present invention includes: a compression processing unit that performs compression processing on n-bit data; a bit-number conversion unit that converts m-bit input image data into n-bit data (where n<m) by performing round-up or round-down processes on the lower (m−n) bits of the m-bit input image data, and feeds the obtained n-bit image data to the compression processing unit; and a conversion processing control unit that selects either one of the round-up process and the round-down process to be performed on each datum of the input image data in accordance with a predefined rule on the basis of the position of a frame to which the datum belongs and the position in the frame at which the datum is located, and gives the bit-number conversion unit instructions to perform the selected round-up process or round-down process. The conversion processing control unit selects either one of the round-up process and the round-down process to be performed on the input image data, in accordance with the predefined rule, on a horizontal line-by horizontal line basis, on a plural horizontal lines-by plural horizontal lines basis, or on a part of horizontal line-by part of horizontal line basis in one frame to which the input image data belong, and at the same time switches between selection patterns for selecting the round-up process and the round-down process in accordance with the position of the frame to which the input image data belong. One selection pattern to select either one of the round-up process and the round-down process, which the conversion processing control unit employs, is a pattern to select the round-up process and the round-down process alternately on a horizontal line-by horizontal line basis or on a plural horizontal lines-by plural horizontal lines basis beginning at the first horizontal line in one frame. The other selection pattern to select either one of the round-up process and the round-down process is a pattern to select the round-down process and the round-up process alternately on a horizontal line-by horizontal line basis or on a plural horizontal lines-by plural horizontal lines basis beginning at the first horizontal line in one frame.

A signal processing method according to the embodiment of the present invention for performing compression processing on n-bit data after converting m-bit input image data into the n-bit data (where n<m) includes: the step of selecting either one of the round-up process and the round-down process to be performed on each datum of input image data in accordance with a predefined rule on the basis of the position of a frame to which the datum belongs and the position in the frame at which the datum is located; and the step of converting each m-bit input image datum into an n-bit image datum by performing round-up or round-down processes on the lower (m−n) bits of the m-bit input image datum in accordance with the above step of selecting either one of the round-up process and the round-down process. A program according to the embodiment of the present invention is a program that causes an arithmetic processing device to perform the above steps.

In the embodiment of the present invention, "round-up" and "round-down" are alternately performed in accordance with a predefined rule for converting, for example, 10-bit input image data into 8-bit image data in the compression processing of input image data in order to reduce adverse effects owing to rounding errors simply, effectively, and efficiently.

The correlation between the converted n-bit image data and the times when these images are reproduced can be reduced by employing the above lower bit rounding method, so that noise components owing to the rounding errors are dispersed and the adverse effects on the quality of the images are reduced because the noise components can be regarded as if natural distortions.

According to the embodiment of the present invention, special data processes on image data, such as a dithering process where original image data are overlapped with random noises, are not necessary, and the deterioration in the quality of images owing to bit-depth conversion used in the compression processing can be reduced without sacrificing the efficiency of the compression processing.

BRIEF DESCRIPTION OF THE DRAWINGS

FIG. 1 is an explanatory diagram of an authoring system to which an embodiment of the present invention can be applied;

FIG. 2 is a block diagram of a video compression processing device according to the embodiment of the present invention;

FIG. 3A and FIG. 3B are explanatory diagrams of a round-down process and a round-up process according to the embodiment of the present invention respectively;

FIG. 4 is a flowchart of signal processing according to the embodiment of the present invention;

FIG. 6A, FIG. 6B, and FIG. 6C are explanatory diagrams of switching of conversion patterns defined on a frame-by-frame basis according to the embodiment of the present invention;

FIG. 7A and FIG. 7B are explanatory diagrams of other conversion patterns according to the embodiment of the present invention;

FIG. 8A and FIG. 8B are explanatory diagrams of other conversion patterns according to the embodiment of the present invention; and FIG. 9 is an explanatory diagram of other conversion patterns according to the embodiment of the present invention.

DESCRIPTION OF THE PREFERRED EMBODIMENTS

Figure 5A:
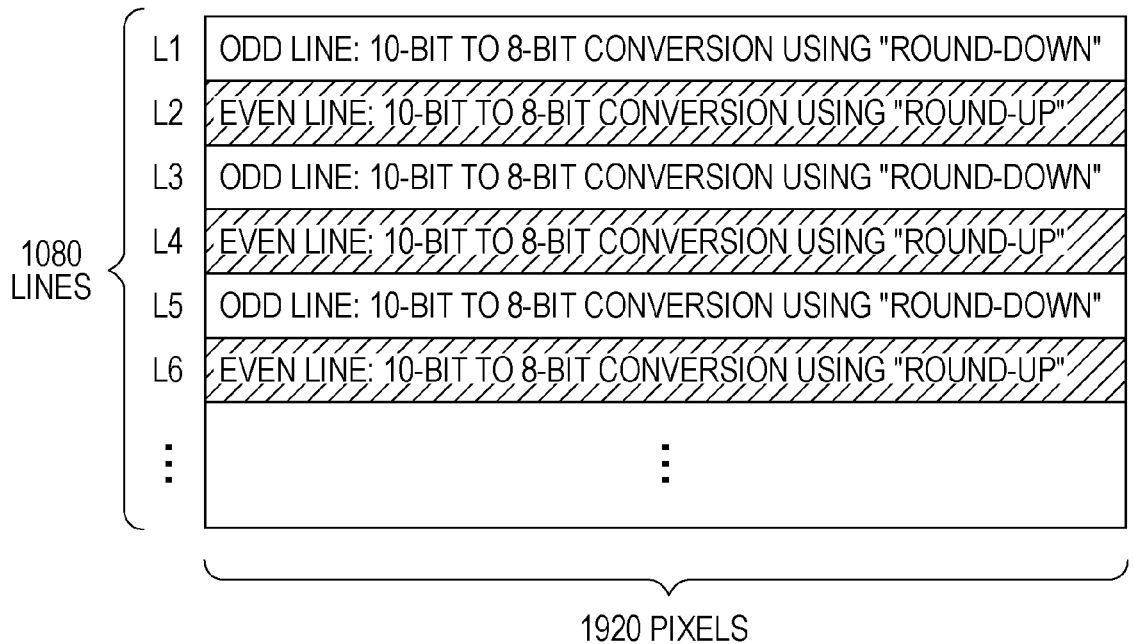
FIG. 5A and FIG. 5B are explanatory diagrams of conversion patterns according to the embodiment of the present invention.

Embodiments of the present invention will be described for the following subjects in the following order.
[1. An Authoring System]
[2. The Configuration and Behavior of a Video Compression Processing Device]
[3. Other Conversion Pattern Examples]
[4. Modifications and a Program]
[1. An Authoring System]

Although a video compression processing device 1 will be described later with reference to FIG. 2 as an embodiment of the present invention, an authoring system in which the video compression processing device 1 is used will be described first. The stream of manufacturing a reproduction-only disc compliant, for example, with the Blu-ray disc standard (a BD-ROM), will be described with reference to FIG. 1.

Firstly, photographing of image materials, recording of audio materials, editing of these materials, and the like are performed for producing materials (S1). Data obtained by photographing, editing, and the like are stored as material data (image data, audio data, caption data, and the like) for content to be produced (S2).

The material data are taken into an authoring studio, and used for disc data (content) production. For example, the material data are stored in hard disks of one of devices that constitute the authoring system, e.g., a computer device. In the authoring studio, contents are produced from the material data with the use of the computer device in which programs for authoring processing are installed, and other necessary hardware devices. In this case, the material data are treated as, for example, 10-bit data.

The image material data and the audio material data are compressed and encoded in predefined formats by video encoding and audio encoding (S3-1, S3-2). In order to compress high-resolution images used in Blu-ray discs and the like, compression schemes, such as MPEG (Moving Picture Experts Group)-2, AVC (Advanced Video Cording), VC-1, are used. The format of data on which compression processing is performed is typically an 8-bit format. Therefore, 10-bit material data are converted into 8-bit data before the compression processing as described later. In addition, menu data, caption data, and the like are created with the use of original caption data (S3-3). After being stored in the hard disks of the computer device and the like, these encoded material data are used for creating content as described later.

Scenarios and menus are created as components for the content (S4). In addition, various types of data are edited (S5). Subsequently stream data which constitute the content are formed by a multiplexer process with the use of the edited data (S6). The multiplexer process is used for multiplexing image data, audio data, menu data, and the like that have been compressed and encoded by, for example, the MPEG-2 scheme. In this case, multiplexer processes are performed so as to create multiplexed data compatible with files of various formats by interleaving the encoded material data, such as encoded image data, audio data, and caption data that have been stored, for example, in the hard disks. In the multiplexer processes, so called clips, UFD images, and the like are created. The multiplexed data finally created by the multiplexer processes are stored, for example, in the hard disks of a personal computer as a cutting master for manufacturing discs. The cutting master is transmitted to a disc manufacturing facility to be used for manufacturing discs (S7).

In the disc manufacturing facility, pre-mastering (S8) including various data processes, such as encryption and encoding of the data to record the data on discs, is performed so as to create mastering data. In mastering (S9), processes from cutting a disc master to creating a stamper are performed. Finally in replication (S10), optical discs (BD-ROMs) are obtained as final products by creating disc substrates with the use of the stamper, and forming predefined layered structures on the disc substrates.

In the above disc manufacturing processes, the signal processing apparatus, the signal processing method, and the program according to the embodiment of the present invention can be utilized in the video encoding (S3-1) where compressing, encoding, and the like are performed on the image materials (material data). The video compression processing device 1 according to the embodiment of the present invention is realized by hardware or software as a device that performs signal processing in the video encoding (S3-1).

[2. The Configuration and Behavior of a Video Compression Processing Device]

The video compression processing device 1 according to this embodiment of the present invention is utilized for compression processing of image data in the process of the video encoding (S3-1) in the authoring of, for example, Blu-ray discs.

In order to compress high-resolution images used in Blu-ray discs and the like, compression schemes, such as MPEG (Moving Picture Experts Group)-2, AVC (Advanced Video Cording), VC-1, are used, and the format of data on which compression processing is performed is typically an 8-bit format. However, the format of master data (image materials) used in authoring studios is typically a 10-bit format. These master data are recorded in professional-use digital tapes or digital files that are called complete package media. The master data recorded in the digital tapes are directly input in a compression processing device from professional-use tape decks through HD-SDI transmission, or temporarily stored in digital files.

In the process of converting 10-bit data into 8-bit data, a method in which compression processing is performed by uniformly "rounding down" or "rounding up" the lower 2 bits will be adopted if the efficiency of the compression processing is emphasized. In this case, however, a quasi-contour and the like are generated owing to rounding errors as described before.

Therefore, in this embodiment of the present invention, in order to reduce the occurrence of quasi-contours and at the same time make the compression processing efficient, the "round-down" process and the "round-up" process are alternately performed on one image on a line-by line basis. In addition, the data located at the same positions of frames different from each other in terms of a time axis are alternately "rounded down" or "rounded up". Owing to this treatment, quasi-contour components are dispersed in the successive images along the direction of the time axis without any special processes on the image data, with the result that the occurrence of noise in the images can be reduced. In addition, by associating time information with "round-down" and "round-up" processes, an effective system that secures excellent repeatability of images after decompression processing can be realized in this embodiment of the present invention.

FIG. 2 shows a block diagram of a video compression processing device 1 according to the embodiment of the present invention. Each block of this video compression processing device 1 can be composed of hardware components. Alternatively, each block can be realized by software functions installed, for example, in a computer device used in the authoring system.

The video compression processing device 1 includes: a bit-number conversion unit 2; a line detection/frame count unit 3; a frame position detection unit 4; a color space conversion unit 5; an image data compression processing unit 6; and a conversion processing control unit 7.

10-bit image material data are input into this video compression processing device 1 as target image data of encoding. These 10-bit image material data are fed to the bit-number conversion unit 2 and the line detection/frame count unit 3.

The bit-number conversion unit 2 converts the 10-bit input image data into 8-bit data by performing a round-up process or a round-down process on the lower 2 bits of the 10-bit input image data. Here, the round-down process and the round-up process are, for example, processes shown in FIG. 3A and FIG. 3B. As shown in FIG. 3A, the round-down process is a process where the lower 2 bits (underlined bits in FIG. 3A) of 10-bit data are rounded down to convert the 10-bit data to 8-bit data. Therefore, any of "0100110000", "0100110001", "0100110010", and "0100110011" is converted to "01001100" as shown in FIG. 3A. On the other hand, as shown in FIG. 3B, the round-up process is a process where the lower 2 bits (underlined bits in FIG. 3B) of 10-bit data are rounded down or rounded up on the basis of the value of the lower 2 bits to convert the 10-bit data to 8-bit data. In other words, in this case, the value of the lower 2 bits is either one of "00", "01", "10", and "11", and if the value is "00" or "01", the 8-bit data is composed of the upper 8 bits of the 10-bit data, and if the value is "10" or "11", the 8-bit data is composed of the sum of the upper 8 bits of the 10-bit data and the lowest (8th) bit "1". Therefore, any of "0100110000", and "0100110001" is converted to "01001100", and any of "0100110010", and "0100110011" is converted to "01001101" as shown in FIG. 3B.

The bit-number conversion unit 2 converts the 10-bit input image data to 8-bit data by executing the above described round-down process or round-up process, and fed the converted 8-bit data to the color space conversion unit 5. Instructions concerning which of the round-down process or round-up process is to be performed on each of the input image data are given to the bit-number conversion unit 2 by the conversion processing control unit 7.

In the color space conversion unit 5, the 8-bit image data are converted to 8-bit image data with a 4:2:2 format, a 4:2:0 format, or the like, and the color difference data of the 8-bit image data obtained after the conversion are fed to the image data compression processing unit 6. The image data compression processing unit 6 performs compression processing on the 8-bit image data fed by the color space conversion unit 5, and outputs the compressed image data. The compression processing performed by the image data compression processing unit 6 is, for example, MPEG-2, AVC, or VC-1.

The line detection/frame count unit 3 detects whether each of the horizontal lines that constitute a frame of the input image data is an odd-numbered line or an even-numbered line, and feeds an odd/even check signal O/E to the conversion processing control unit 7. In addition, the line detection/frame count unit 3 feeds frame count information FC that identifies a frame that has been currently dealt with to the frame position detection unit 4.

In addition, encoded block specifying information is input into the frame position detection unit 4. To put it concretely, time information (a time code) about input image material data is input into the frame position detection unit 4, and the frame position detection unit 4 detects the current frame position with the use of the time information along with the frame count information FC that is input from the line detection/frame count unit 3. Then, the frame position detection unit 4 feeds frame position information FP to the conversion processing control unit 7. The encoded block specifying information specifies a certain encoded block with the use of time codes. Suppose that an interval from "01:00:00:00" to "01:30:00:00" (the numbers in the double quotation marks represents "hour: minute:second:frame position number" in this order) is specified as an encoded block. In this case, the frame position detection unit 4 feeds pieces of frame position information FP corresponding to individual frames, such as "01:00:00:00", "01:00:00:01", "01:00:00:02", and the like, to the conversion processing control unit 7 in accordance with the frame count information FC. With the use of these pieces of frame position information FP, the conversion processing control unit 7 can check the current frame position of the input image data.

If all the units in FIG. 2 are composed of hardware components, the encoded block specifying information is fed from a control unit (a microcomputer or the like) that is not shown in FIG. 2. If all the units in FIG. 2 are realized by software functions, the encoded block specifying information is specified by a video encoding application and the like used for the video compression processing.

The conversion processing control unit 7 selects either one of "round-down" and "round-up" in accordance with the current frame position of the input image data and the checked result on whether the current line is an odd-numbered line or an even-numbered line shown by the odd/even check signal O/E, and then informs the bit-number conversion unit 2 of the selected result. The bit-number conversion unit 2 performs the round-up process or the round-down process on individual image data on the current horizontal line in accordance with the instructions from the conversion processing control unit 7.

A concrete example of processes performed by this video compression processing unit 1 will be described with reference to FIG. 4. Firstly, at step F101, an encoded block is specified for the frame position detection unit 4 for preparing signal processing. Then, the conversion processing control unit 7 performs processes on the basis of the odd/even check signal O/E from the line detection/frame count unit 3 and the frame position information FP from the frame position detection unit 4 at step F101 and later.

At step F102, the conversion processing control unit 7 checks whether the current frame position number is even or not with the reference of the frame position information FP. The conversion processing control unit 7 is equipped with two patterns, that is, a pattern A and a pattern B as selection patterns for selecting the round-up or round-down for converting 10-bit data into 8-bit data (the pattern A and the pattern B will be called the conversion pattern A and conversion pattern B hereinafter).

Figure 5B:
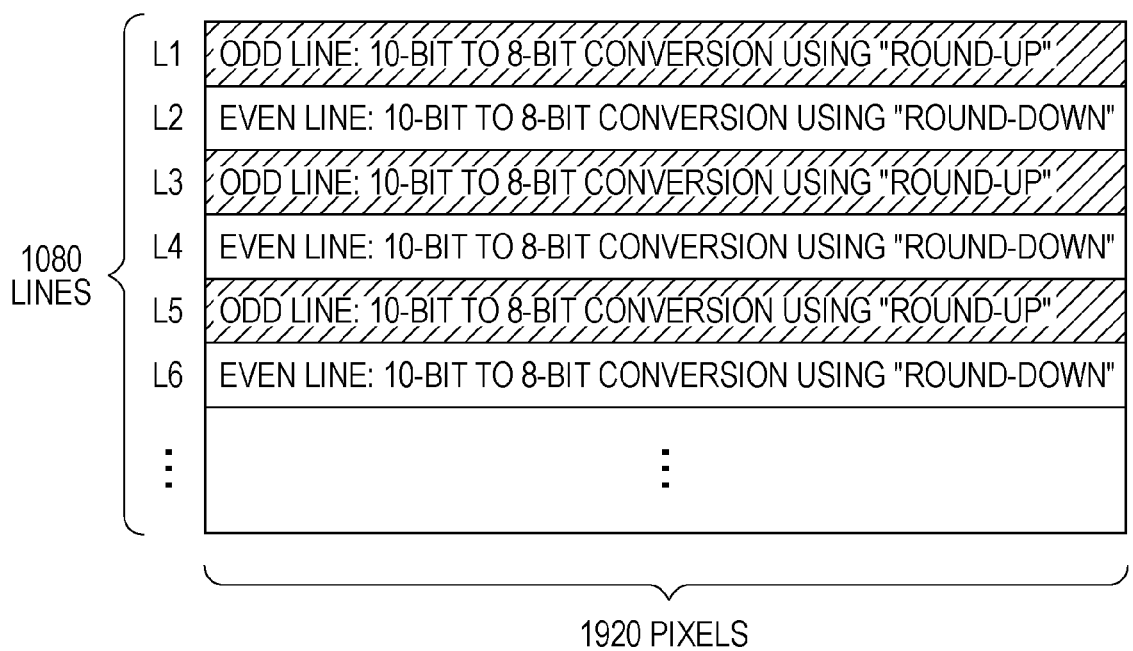

The conversion pattern A is a pattern where the round-down process and the round-up process are alternately performed beginning with the first horizontal line in one frame (that is, for example, composed of 1080 lines×1920 pixels) as shown in FIG. 5A. To put it concretely, the conversion pattern A is a pattern where the round-down process is performed on the odd-numbered lines L1, L3, L5 and the like, and the round-up process is performed on the even-numbered lines L2, L4, L6 and the like under the assumption that the horizontal lines are denoted by L1, L2, L3, and the like beginning with the first horizontal line. On the other hand, the conversion pattern B is a pattern where the round-up process and the round-down process are alternately performed beginning with the first horizontal line in one frame as shown in FIG. 5B. In other words, the conversion pattern B is a pattern where the round-up process is performed on the odd-numbered lines L1, L3, L5 and the like, and the round-down process is performed on the even-numbered lines L2, L4, L6 and the like.

If it is judged that the current frame position number of the input image data is even at step F102, the flow proceeds to step F103, and the conversion processing control unit 7 sets the conversion pattern A for the current frame. In other words, the round-down process is specified for the odd-numbered lines, and the round-up process is specified for the even-numbered lines. At step F105, the conversion processing control unit 7 judges whether the current line of the input image data is an even-numbered line or an odd-numbered line on the basis of the odd/even check signal O/E. If the current line (the line on which the input image data is located as a target of the conversion processing by the bit-number conversion unit 2) is an odd-numbered line, the flow proceeds to step F106 and the conversion processing control unit 7 instructs the bit-number conversion unit 2 to perform the round-down process. If the current line is an even-numbered line, the flow proceeds to step F107 and the conversion processing control unit 7 instructs the bit-number conversion unit 2 to perform the round-up process. The above processes are repeated until it is judged that the bit-number conversion process for the last line of the current frame is finished at step F108. Therefore, in the bit-number conversion unit 2, the round-down process and the round-up process are alternately performed on the input image data in accordance with the conversion pattern A shown in FIG. 5A, that is, the round-down process on the input image data on the first line, the round-up process on the input image data on the second line, and the like in this order.

After the bit-number conversion process for the last line is finished, the frame position number of the next frame is set to the frame position number shown by the frame position information FP fed from the frame position detection unit 4. At step F108, the conversion processing control unit 7 judges that the bit-number conversion process for the last line of the current frame has been finished, and the flow goes back to step F102 from step F114.

At step F102, the frame position number shown by the frame position information FP is odd this time, so the flow proceeds to step F109.

At step F109, the conversion processing control unit 7 sets the conversion pattern B for the current frame. In other words, the round-up process is specified for the odd-numbered lines, and the round-down process is specified for the even-numbered lines. At step F110, the conversion processing control unit 7 judges whether the current line of the input image data is an even-numbered line or an odd-numbered line on the basis of the odd/even check signal O/E. If the current line (the line on which the input image data is currently located as a target of the conversion processing by the bit-number conversion unit 2) is an odd-numbered line, the flow proceeds to step F112 and the conversion processing control unit 7 instructs the bit-number conversion unit 2 to perform the round-up process. If the current line is an even-numbered line, the flow proceeds to step F111 and the conversion processing control unit 7 instructs the bit-number conversion unit 2 to perform the round-down process. The above processes are repeated until it is judged that the bit-number conversion process for the last line of the current frame is finished at step F113. Therefore, in the bit-number conversion unit 2, the round-up process and the round-down process are alternately performed on the input image data in accordance with the conversion pattern B shown in FIG. 5B, that is, the round-up process on the input image data on the first line, the round-down process on the input image data on the second line, and the like in this order.

After the bit-number conversion process for the last line is finished, the frame position number of the next frame value is set to the frame position number shown by the frame position information FP fed from the frame position detection unit 4. In this case, at step F113, the conversion processing control unit 7 judges that the bit-number conversion process for the last line of the current frame has been finished, and the flow goes back to step F102 from step F114.

The above described processes are repeated until the 10-bit to 8-bit conversion for the last frame of the encoded block is finished. If it is judged that the bit-number conversion process for the last frame of the encoded block is finished at step F114, the flow of converting 10-bit data into 8-bit data ends. For example, the frame position detection unit 4 stops feeding the frame position information FP, and the conversion processing control unit 7 stops its operation accordingly.

As a result, the bit-number conversion process for the frames included in the encoded block is performed using alternately the pattern A and the pattern B as shown in FIG. 6A. Let's suppose that the first frame of the encoded block is denoted by F0, the last frame is denoted by Fn, and other frames are denoted by F1, F2, and the like as shown in FIG. 6A. In this case, the 10-bit to 8-bit conversion with the use of the conversion pattern A shown in FIG. 5A is performed on the even-numbered frames F0, F2, F4, and the like. On the other hand, the 10-bit to 8-bit conversion with the use of the conversion pattern B shown in FIG. 5B is performed on the odd-numbered frames F1, F3, F5, and the like.

As described above, in the video compression processing device 1 according to this embodiment, the 10-bit to 8-bit conversion is performed on the image data—the target data of encoding—on the odd-numbered lines of the first frame by "rounding down" the input 10-bit data before the compression processing. On the other hand, the 10-bit to 8-bit conversion is performed on 10-bit image data on the even-numbered lines by "rounding up" the input 10-bit data before the compression processing. As for the second frame, the 10-bit to 8-bit conversion is performed on the image 10-bit data on the odd-numbered lines by "rounding up" the 10-bit image data, and the 10-bit to 8-bit conversion is performed on the 10-bit image data on the even-numbered lines by "rounding down" the 10-bit image data before the compression processing. The above described conversions are alternately performed on the image 10-bit data on the even-numbered lines and the 10-bit image data on the odd-numbered lines in the ascending order of the line numbers.

By adopting the above-described method of the conversion, noise components that have an effect on the quality of images owing to the bit-depth conversion can be dispersed along the direction of the time axis as well, so that the high quality of successive images can be effectively and efficiently obtained. In other words, because this method of the conversion does not use special processes such as a dithering process where original images are overlapped with random noises in order to alleviate the occurrence of quasi-contours, this method is very useful in the accurate reproduction of original data. In addition, because the round-up process and the round-down process are alternately performed on the lower bits of the data of pixels for the same positions of frames different from each other in terms of a time axis, the occurrence of quasi-contours owing to rounding errors can be reduced. In addition, the round-up process and the round-down process are alternately performed on the lower bits of the data of the lines in one frame on a line-by-line basis, with the result that the components of quasi-contours are reduced. Therefore, this method of the conversion according to the embodiment of the present invention is more helpful in reproducing images of high quality than related various types of conversion processing.

In addition, an additional data conversion process for overlapping original image data with random noise components is unnecessary in this method of the conversion, which leads to the efficiency of the authoring processing. In related arts, a dithering process has been performed on part of an image because, if the dithering process is performed on the whole area of the image, the total bit rate decreases and the quality of the image deteriorates. Performing a dithering process on part of an image may be troublesome because it is necessary to select the part of the image to which the dithering is applied, while the method of the conversion according to this embodiment does not cause any trouble even if it is applied to the whole of the input image data that belong to one encoded block. Adopting the method of the conversion according to this embodiment also leads to the efficiency of the authoring processing from the above viewpoint. The selection of the round-up process or the round-down process according to this embodiment is not difficult, and it is easily executed by switching between the round-up process and the round-down process only on a frame-by-frame basis or on a line-by-line basis. Therefore, a problem that hardware components for constituting the above selection mechanism become complicated, or another problem that software for realizing the above selection bears a heavy load does not arise.

In addition, there are many cases where it is necessary to repeat encoding for obtaining images of high quality. For example, after examination of images, on which compression encoding has been already performed, during the authoring processing, it often becomes necessary that the images are again encoded. In this embodiment, because the conversion pattern A or B is selected on a frame position-by-frame position basis. Therefore, which pattern was performed on each frame in an encoded block can be identified after the conversion. In addition, which was performed on each line, the round-down process or round-up process, can be also identified. In other words, the conversion pattern A and B are alternately applied to the frames belonging to an encoded block beginning with the patter A applied to the first frame. Therefore, it can be identified that the conversion pattern B was applied to the frame 5 in FIG. 6A. In addition, it can be also identified that the round-up process was performed on the odd-numbered lines L1, L3, and the like of the frame F5. If the round-down and round-up processes are selected randomly for the lines, it is difficult to identify which bit-number conversion process was performed on the data located on the lines of each frame. It means that, according to the embodiment of the present invention, when all the data or part of the data of a certain encoded block are again encoded, the same bit-number conversion process (the round-up process or the round-down process) as performed before can be performed on each image datum. Therefore, there is no threat that the re-encoded images have unintended changes, which is preferable for the authoring processing. In other words, defining the relation between the position of the frame and the selection of the "round-down" or "round-up" regarding the odd/even-numbered lines enables the accurate repeatability of the re-encoded images to be secured even if the compression processing is repeated many times.

[3. Other Conversion Pattern Examples]

The conversion patterns for selecting the round-up process or round-down process, and the conversion patterns performed on a frame-by-frame basis are not limited to the above described conversion patterns, and various types of conversion patterns may be made.

In the case where the conversion patterns A and B are used, it may be unnecessary to switch between the conversion patterns A and B alternately on a frame-by-frame basis. For example, FIG. 6B shows an example where the conversion patterns A and B are selected alternately on a three frames-by-three frames basis. In a similar way to the above, one conversion pattern where the conversion patterns A and B are alternately selected on a plural frames-by-plural frames basis is also conceivable. In a practical sense, there are some cases where selecting alternately the conversion patterns A and B every several frames is more effective than selecting alternately every frame from the view point of the reduction of quasi-contours. Every how many frames the conversion patterns A and B have to be alternately selected may be decided by various factors such as the content of an image, the frame rate, the bit-number of the image data. Therefore, every how many frames the conversion patterns A and B have to be alternately selected can be decided by actually trying several cases to find the suitable number of frames.

In addition, as for the conversion patters themselves, various types of conversion patterns are also conceivable from the similar view point. Some of the conversion patterns are shown in FIG. 7A, FIG. 7B, FIG. 8A, FIG. 8B, and FIG. 9. Each diagram shows lines of one frame schematically. In each diagram, shaded areas represent areas where the round-up process is performed, and non-shaded areas represent areas where the round-down process is performed.

FIG. 7A is an example showing a conversion pattern where the round-up process and the round-down process are alternately selected every two lines. In a conversion pattern A, the round-up process is selected on the first and second lines, the round-down process is selected on the third and fourth lines, the round-up process is selected on the fifth and seventh lines, and the like. In a conversion pattern B, the round-down process is selected on the first and second lines, the round-up process is selected on the third and fourth lines, the round-down process is selected on the fifth and seventh lines, and the like. As described above, the conversion pattern where the round-up process and the round-down process are alternately selected every two lines is conceivable. In addition, a conversion pattern where the round-up process and the round-down process are alternately selected every plural lines such as every three lines or every four line is also conceivable. In the above described examples, it is necessary that the line detection/frame count unit 3 does not feed the odd/even check signal O/E, but feeds information about the current line number to the conversion processing control unit 7. It is all right that the above examples are configured so that, after checking the frame position and the line number with the use of the information given by the line detection/frame count unit 3, the conversion processing control unit 7 instructs the bit-number conversion unit 2 to perform the round-up process or round-down process in accordance with the checked results.

FIG. 7B is an example showing a conversion pattern where the round-up process and the round-down process are alternately selected every half a line. In a conversion pattern A, the round-up process is selected on the first half of each line, and the round-down process is selected on the second half of each line. In a conversion pattern B, the round-down process is selected on the first half of each line, and the round-up process is selected on the second half of each line. As described above, it is conceivable that the round-up process and the round-down process are alternately selected on a half a line-by-half a line basis on every line in one frame. It goes without saying that it is conceivable that the round-up process and the round-down process are alternately selected on a third part of a line-by-third part of a line basis, on a fourth part of a line-by-fourth part of a line basis, or the like on every line in one frame. In other words, an example where the round-up process and the round-down process are alternately selected on a part of a line-by-part of a line basis on every line is conceivable. In the case where the round-up process and the round-down process are alternately selected on a part of a line-by-part of a line basis on every line, it is necessary that the line detection/frame count unit 3 also detects the current datum number on one horizontal line, and feeds the current datum number to the conversion processing control unit 7. It is all right that the above examples are configured so that, after checking the current frame position number and the position of the current datum on the line, the conversion processing control unit 7 instructs the bit-number conversion unit 2 to perform the round-up process or round-down process in accordance with the checked results.

FIG. 8A is an example showing a conversion pattern where the round-up process and the round-down process are alternately selected every half a line and at the same time the rounded-up process and rounded-down process are selected alternately along the vertical direction in a frame on a line-by-line basis. In a conversion pattern A, the round-up process is selected on the first half of each odd-numbered line, and the round-down process is selected on the second half of each odd-numbered line. On the other hand, the round-down process is selected on the first half of each even-numbered line, and the round-up process is selected on the second half of each even-numbered line. In a conversion pattern B, the round-down process is selected on the first half of each odd-numbered line, and the round-up process is selected on the second half of each odd-numbered line. On the other hand, the round-up process is selected on the first half of each even-numbered line, and the round-down process is selected on the second half of each even-numbered line. By using such conversion patterns A and B, the rounding errors caused by the round-up process and the round-down process can be dispersed along the direction of the time axis and the directions of the horizontal/vertical axes in a frame. In the case where the bit-conversion is performed with the use of these conversion patterns A and B, it is necessary that the line detection/frame count unit 3 also detects the current datum number on one horizontal line, and feeds the current datum number along with the odd/even check signal O/E to the conversion processing control unit 7. It is all right that the above examples are configured so that, after checking the current frame position number, the position of the current datum on the horizontal line, and which the horizontal line is, an even-numbered line or an odd-numbered line, the conversion processing control unit 7 instructs the bit-number conversion unit 2 to perform the round-up process or round-down process in accordance with the checked results.

FIG. 8B is an example showing a conversion pattern where the round-up process and the round-down process are alternately selected every half a line and at the same time the rounded-up process and rounded-down process are selected alternately along the vertical direction in a frame on a two lines-by-two lines basis. In a conversion pattern A, the round-up process is selected on the first half of each of the first and second lines, and the round-down process is selected on the second half of each of the first and second lines. Next, the round-down process is selected on the first half of each of the third and fourth lines, and the round-up process is selected on the second half of each of the third and fourth lines. These processes are repeated on a two lines-by-two lines basis. In a conversion pattern B, the round-down process is selected on the first half of each of the first and second lines, and the round-up process is selected on the second half of each of the first and second lines. Next, the round-up process is selected on the first half of each of the third and fourth lines, and the round-down process is selected on the second half of each of the third and fourth lines. These processes are repeated on a two lines-by-two lines basis. By using such conversion patterns A and B, the rounding errors caused by round-up and round-down processes can be dispersed along the direction of the time axis and the directions of the horizontal/vertical axes in a frame. In the case where the bit-conversion is performed with the use of these conversion patterns A and B, it is necessary that the line detection/frame count unit 3 also detects the current datum number on one horizontal line and the current line number, and feeds the current datum number that shows the position of the current datum on the current line and the current line number to the conversion processing control unit 7. It is all right that the above examples are configured so that, after checking the frame position, the position of the current datum on the horizontal line, and the horizontal line number, the conversion processing control unit 7 instructs the bit-number conversion unit 2 to perform the round-up process or round-down process in accordance with the checked results.

Three or more types of conversion patterns can be used. FIG. 9 shows, for example, three conversion patterns A, B, and C. In the conversion pattern A, one line is divided into three third parts of a line, and the round-up process is selected on the first third part and the second third part, and the round-down process is selected on the last third part. In the conversion pattern B, the round-down process is selected on the first third part, and the round-up process is selected on the second third part and the last third part. In the conversion pattern C, the round-up process is selected on the first third part and the last third part, and the round-down process is selected on the second third part. As described above, the conversion processing where three or more conversion patterns are set is conceivable.

Even in the case where three or more conversion patterns are used, it is all right that these conversion patterns are alternately selected on a frame-by-frame basis. For example, as shown in FIG. 6C, the conversion patterns A, B, and C are alternately selected on a frame-by-frame basis. It goes without saying that it is also all right that the conversion patterns A, B, and C are alternately selected on a plural frames-by-plural frames basis.

Although some examples of conversion patterns, and some examples of conversion patterns selected on a frame-by-frame basis have been described, other various types of conversion patterns, and other various types of conversion patterns selected on a frame-by-frame basis are conceivable.

[4. Modifications and a Program]

The present invention is not limited to the above-described embodiment, and various modifications may be made. In the above-described embodiment, although the conversion of 10-bit image data into 8-bit image data for compression processing has been described, the present invention can be applied to the conversion between image data of other bit numbers.

In addition, in the above-described embodiment, although the present invention has been applied to the video compression processing device 1 used in an authoring system, the present invention can be applied to various types of devices that deal with image processing. For example, it is expected that the present invention can be applied to image reproducing apparatuses, imaging apparatuses, image recording apparatuses, game machines, video-editing machines, and the like. In addition, it is naturally expected that the video compression processing device 1 is used in various information processing apparatuses that deal with image data, such as general-purpose personal computers, cellular phones, and PDAs (personal digital assistances). For example, provided with a program that causes an arithmetic processing device to execute the signal processing shown in FIG. 4 as application software for image processing, personal computers and the like can perform an applicable bit-number conversion process as a process before compression processing.

A program used in an embodiment of the present invention is applicable to the signal processing for converting m-bit input image data into n-bit data (where n<m) before compression processing. In this case, this program causes the arithmetic processing device to execute the step of selecting either one of the round-up process and the round-down process to be performed on each datum of the input image data in accordance with a predefined rule on the basis of the position of a frame to which the datum belongs and the position in the frame at which the datum is located. In addition, the program causes the arithmetic processing device to execute either one of the round-up process or the round-down process on the lower (m−n) bits of each datum of the input image data in accordance with the result of the above step as a bit conversion step for obtaining n-bit image data. Using such a program, various types of devices as mentioned above can perform an applicable bit-number conversion process as a process before compression processing. In other words, such a program as this enables the personal computers and the like to realize the signal processing method according to an embodiment of the present invention.

Such a program can be stored in advance in HDDs embedded in the personal computers and the like as recording media, or in ROMs, flash memories, and the like embedded in microcomputers equipped with CPUs. In addition, the program can be temporarily or permanently stored in removable recording media, such as flexible discs, CD-ROMs (compact disc read only memories), MOs (magnet optic discs), DVDs, BDs, magnetic discs, and semiconductor memories. The program stored in these removable recording media can be provided as so-called packaged software. The program can be also installed in personal computers or the like from the removable recording media, or can be downloaded in personal computers or the like through networks such as LANs (local area networks) and the Internet.

The present application contains subject matter related to that disclosed in Japanese Priority Patent Application JP 2009-093923 filed in the Japan Patent Office on Apr. 8, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:
    a compression processing unit to perform compression processing on n-bit data;
    a bit-number conversion unit to convert m-bit input image data into n-bit image data (where n<m) by performing round-up or round-down processes on a lower (m−n) bits of the m-bit input image data, and to feed the obtained n-bit image data to the compression processing unit; and
    a conversion processing control unit to select either one of the round-up process and the round-down process to be performed on each datum of the input image data in accordance with a predefined rule based at least in part on a first position of a frame to which the datum belongs and a second position in the frame at which the datum is located, and to instruct the bit-number conversion unit to perform the selected round-up process or round-down process.

2. The signal processing apparatus according to claim 1, wherein the conversion processing control unit selects either one of the round-up process and the round-down process to be performed on each datum of input image data, in accordance with the predefined rule, based at least in part on one horizontal line, a plurality of horizontal lines, or part of one horizontal line in one frame to which the datum belongs, and at a same time switches between two selection patterns to select the round-up process or the round-down process in accordance with the position of the frame to which the datum belongs.

3. The signal processing apparatus according to claim 2, wherein:
    a first selection pattern, of the two selection patterns used to select one out of the round-down process and the round-up process, which the conversion processing control unit employs, is used to select the round-up process and the round-down process alternately based at least in part on one horizontal line or a plurality of horizontal lines beginning at the first horizontal line in one frame; and
    a second selection pattern, of the two selection patterns used to select one out of the round-up process and the round-down process, is used to select the round-up process and the round-down process alternately based at least in part on one horizontal line or a plurality of horizontal lines beginning at the first horizontal line in one frame.

4. A signal processing method implemented by an arithmetic processing device for performing compression processing on n-bit data after converting m-bit input image data into n-bit data (where n<m), the signal processing method comprising the steps of:
    selecting either one of a round-up process and a round-down process to be performed on each datum of the input image data, in accordance with a predefined rule, based at least in part on a first position of a frame to which the datum belongs and a second position in the frame at which the datum is located; and converting each m-bit input image datum into an n-bit image datum by performing round-up process or round-down process on a lower (m−n) bits of the m-bit input image datum.

5. A computer readable medium on which is stored a program which, when implemented causes an arithmetic processing device to perform signal processing used in compression processing performed on n-bit data after converting m-bit input image data into n-bit data (where n<m), the signal processing comprising the steps of:

selecting either one of a round-up process and a round-down process to be performed on each datum of the input image data in accordance with a predefined rule based at least in part on a first position of a frame to which the datum belongs and a second position in the frame at which the datum is located; and converting each m-bit input image datum into an n-bit image datum by performing round-up process or round-down process on a lower (m−n) bits of the m-bit input image datum.

* * * * *